US012309674B2

(12) United States Patent
Belwal et al.

(10) Patent No.: US 12,309,674 B2
(45) Date of Patent: May 20, 2025

(54) NEAR REAL-TIME NETWORK SERVICE DEPLOYMENT ACROSS DIFFERENT WIRELESS COMMUNICATION PROTOCOLS

(71) Applicant: T-Mobile Innovations LLC, Overland Park, KS (US)

(72) Inventors: Deepesh Belwal, Ashburn, VA (US); Anuj Sharma, Broadlands, VA (US); Sriharsha Nagaraja Kadalbal, Sammamish, WA (US); Dipta Biswas, Bothell, WA (US); Henry Ha, Covington, WA (US); Kalpana Pinnaka, Bellevue, WA (US); Kumar Pushkar, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 813 days.

(21) Appl. No.: 17/565,955

(22) Filed: Dec. 30, 2021

(65) Prior Publication Data

US 2023/0217223 A1   Jul. 6, 2023

(51) Int. Cl.
*H04L 67/00* (2022.01)
*H04W 4/50* (2018.01)
*H04W 8/18* (2009.01)
*H04W 80/10* (2009.01)

(52) U.S. Cl.
CPC .............. *H04W 4/50* (2018.02); *H04W 8/18* (2013.01); *H04W 80/10* (2013.01)

(58) Field of Classification Search
CPC ......... H04W 4/50; H04W 8/18; H04W 80/10; H04W 8/20; H04L 67/34; H04L 69/18
See application file for complete search history.

(56) References Cited

U.S. PATENT DOCUMENTS

2024/0333687 A1* 10/2024 Kaciulis .............. H04L 12/4641

* cited by examiner

*Primary Examiner* — Joseph E Dean, Jr.
(74) *Attorney, Agent, or Firm* — Shook, Hardy & Bacon L.L.P.

(57) ABSTRACT

Systems and methods are provided for causing a prospective provisioning, in near real-time, of various wireless communication protocol databases based on subscribers meeting particular criteria for respective wireless communication protocols. In operation, some aspects are directed to receiving an indication that a first provisioning client associated with a first subscriber has provisioned a first database to access a first service. In response to the receiving, these aspects include automatically read at least a second database to determine whether the second database has already been provisioned to access the first service. At least partially in response to determining that the second database has not already been provisioned to access the first service, these aspects automatically transmit a request to provision the second database such that at least the first subscriber can access the first service using a second wireless communication protocol and a first wireless communication protocol.

20 Claims, 6 Drawing Sheets

NEAR REAL-TIME NETWORK SERVICE DEPLOYMENT ACROSS DIFFERENT WIRELESS COMMUNICATION PROTOCOLS

The present disclosure is directed, in part, to causing multiple databases of multiple wireless communication protocols to be provisioned in near real-time such that a subscriber can seamlessly access a particular service via multiple wireless communication protocols, substantially as shown in and/or described in connection with at least one of the figures, and as set forth more completely in the claims.

Particular aspects improve existing technologies so that there is a seamless user experience and a quick deployment of services, even when such services are only initially built or deployed via a single or a few wireless communication protocols (e.g., 5G, 4G, or LTE). This is because particular embodiments cause a prospective provisioning, in near real-time, of various wireless communication protocol databases based on subscribers meeting particular criteria (e.g., a suitable device type) for respective wireless communication protocols. This allows a subscriber to seamlessly access a service across multiple wireless communication protocols, as described in more detail below.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, telecommunications operators or service providers typically manage communications and services for devices across multiple Radio Access Technologies (RAT) or communication protocols (e.g., 3G, 4G, 5G). When a new service (e.g., a streaming service) is deployed, that service may be deployed using only a single RAT or one RAT at a time. When entities engage in creating a service for multiple RATs, it can take a long time (e.g., 6 months or a year) before a service is ready to be deployed because of the network and database configurations needed to deploy the service across each RAT. Further, deployment time may be delayed because of the dependence on multiple vendors/products and their update roadmaps (e.g., their technical specifications regarding how a product made with respect to a specific RAT will be changed to accommodate a different RAT).

After entities have created a service for a single RAT, subscribers (e.g., users) often move in and out of different Radio Access Networks (RAN), thereby causing issues in RATs that the service has not been created for. For example, a user device may change locations from a 5G area to a 4G area that has not been updated with 5G. However, at the service level, this can be costly if services have not been built using 4G, for example. One challenge is that different RATs include different authentication/authorization databases (e.g., UDR, HSS, HLR) and different provisioning platforms or clients provisioning them. What this means is that every time a service is deployed or moves across different RATs, it has to go through the lengthy process of authorization and authentication, thereby making the service not seamless across the different RATs. This is because it is impossible or difficult to identify user devices on some older RAT databases. Or it is too costly in terms of time. RAT database updates typically occur in bulk at a predetermined scheduling time. This often means that when subscribers move across different RATs, they have a break in service, since they are not able to be authenticated/authorized in near real-time because the updates may occur at some future scheduled time. This causes an uneven user experience, among other things.

Consider the following example, an operator may allow a subscriber to stream an event using 5G at a first location. However, the subscriber (or a user device of the first subscriber) may start rapidly moving away (e.g., due to the subscriber driving away) to a second location while the service is still streaming, thereby causing the service to drop out of a 5G RAT range and into a 4G RAT range. However, the 4G RAT database may not authenticate or authorize the subscriber or otherwise update (e.g., until later that night) due to the batched scheduling requirements. Consequently, this would, for example, cause a delay in streaming of the event the moment the user device enters the 4G range or would cause the streaming event to stop altogether.

Existing telecommunications network technologies do not solve these problems. These existing technologies work with multiple provisioning platforms or provisioning clients. Such clients are often applications of different vendors or products with different product update roadmaps. These clients typically update their provisioning processes to support the new provisioning needs. These clients typically provision each RAT database differently or at different times in response to a trigger to develop platforms as needed. That is, these technologies typically perform asynchronous back-end updates of multiple RAT databases, but the existing client provisioning has a high likelihood of wiping out the asynchronous changes made to support the new services. This is because when a provisioning client requests access to a first database of a first RAT to provide a service, the other RATs are immediately unaware of this and so these other RAT databases are not immediately updated with this information, thereby causing a mismatch of information between databases. Because the other RAT technologies do not know about the client request for the service, the changes made at the back-end often get overwritten.

Various embodiments of the present disclosure improve these existing technologies so that there is a seamless user experience, even when services are accessed across different wireless communication protocols. This is because particular embodiments transmit provision requests, in near real-time, to various RAT databases when a RAT database has been provisioned for a service in order to prospectively provision the other databases of other wireless communication protocols. In operation, particular embodiments first receive an indication that a first provisioning client has provisioned a first database of a first RAT to access a service. And in response to this receiving, particular embodiments automatically read at least a second database of a second RAT to determine whether the second database has already been provisioned to access the service. If the second database has not already been provisioned, particular embodiments can automatically transmit a request to provision the second database. In this way, each RAT database is updated in near real-time so that a subscriber can be automatically authorized and authenticated to employ a service even when the subscriber moves between different RATs.

Using the illustrative example above, for instance, even when the subscriber starts rapidly moving away to a second location while the service is still streaming, thereby causing the service to drop out of a 5G RAT range and into a 4G RAT range, there would be little to no delay or stoppage of the streaming when the user device enters 4G coverage. This is because when a provisioning client provisions the 5G database for the streaming service, particular embodiments will automatically or in near real-time also send prospective provisioning requests to the 4G database such that authentication and authorization can occur in parallel or near the time relative to the 5G authentication and authorization.

As used herein, the terms node, access point, or base station may be used interchangeably or without limitation to describe a link between a fixed network and a mobile station (i.e., a UE). The terms "user device," "user equipment," "UE," "mobile device," "mobile handset," and "mobile transmitting element" all describe a mobile station and may be used interchangeably in this description. Certain terminology may be used to differentiate access points and/or antenna arrays from one another; for example, a combination access point may be used to describe an access point having a primary antenna array and a redundant antenna array that have different orientations (i.e., configured to serve different geographic areas), distinguished from a traditional access point which may be used to describe an access point comprising a single antenna array used to communicate to a single geographic area.

Accordingly, a first aspect of the present disclosure is directed to a method that includes the following operations: receiving, by a first mediation component, an indication that a first provisioning client associated with a first subscriber has provisioned a first database to access a first service. The first database being included in a first radio wireless communication protocol associated with a wireless communication network. In response to the receiving, the method includes automatically reading, by the first mediation component, at least a second database to determine whether the second database has already been provisioned to access the first service, the second database being included in a second wireless communication protocol but not the first wireless communication protocol; and at least partially in response to determining that the second database has not already been provisioned to access the first service, automatically transmitting, by the first mediation component, a request to provision the second database, wherein the second database is provisioned such that at least the first subscriber can access the first service using at least the second wireless communication protocol.

A second aspect of the present disclosure is directed to a system that includes at least one computer processor and one or more computer storage media storing computer-useable instructions that, when used by the at least one computer processor, cause the at least one computer processor to perform the following operations—receiving an indication that a first provisioning client associated with a first subscriber has provisioned a first database to access a first service. The first database is associated with a first wireless communication protocol of a wireless communication network. In response to the receiving, automatically determining whether the second database has already been provisioned to access the first service. The second database is associated with a second wireless communication protocol but not the first wireless communication protocol. At least partially in response to determining that the second database has not already been provisioned to access the first service, automatically causing a provisioning of the second database such that at least the first subscriber can access the first service using second wireless communication protocol and the first wireless communication protocol.

According to another aspect of the technology described herein, one or more computer-readable media is provided having computer-executable instructions embodied thereon that, when executed, cause the one or more processors to perform the following operations—receive a request for a first subscriber to access a first service. At least partially responsive to the receiving, determining whether a plurality of databases have been provisioned for the first subscriber to access the first service. Each database, of the plurality of databases, are associated with a unique wireless communication protocol. Based at least in part on the first subscriber meeting criteria to access the first service using at least a first wireless communication protocol and a second wireless communication protocol, automatically causing the provisioning of the plurality of databases such that the first subscriber can access the first service using at least the second wireless communication protocol and the first wireless communication protocol.

Figure 1:
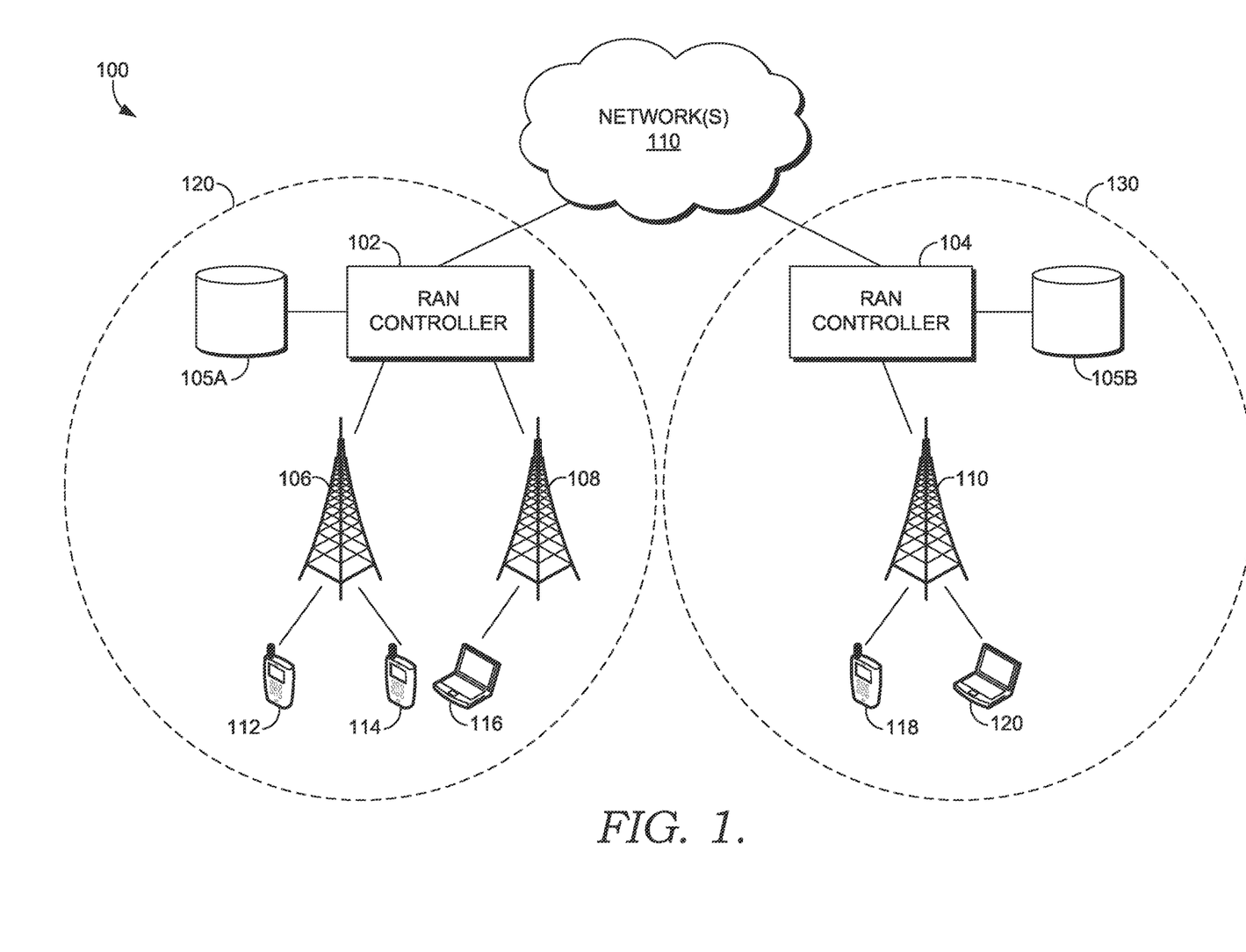
FIG. 1 illustrates a diagram of an example network environment in which embodiments of the present disclosure may be employed.

FIG. 1 is a schematic diagram of a telecommunications network environment 100 (hereinafter "network environment 100") for which particular embodiments of the present disclosure are employed in. Network environment 100 generally includes various subscriber devices (also referred to as "user devices") 112, 114, 116, 118, and 120, various cell sites 106, 108, and 110, Radio Access Networks (RANS) 120 and 130, which include multiple Radio Access Network (RAN) controllers 102 and 104, data stores 105A and 105B, all of which are configured to wirelessly communicate via the one or more networks 110. As used herein, the term "cell site" is used to generally refer to one or more cellular base stations, nodes, RRUs control components, and the like (configured to provide a wireless interface between a wired network and a wirelessly connected user device) that are geographically concentrated at a particular site, so as not to obscure the focus of the present invention. The cell sites 106, 108, and 110 may include a macro cell, small cell, femto cell, pico cell, or any other suitably sized cell, as desired by a network carrier for communicating within a particular geographic area. In some aspects, these cell sites may comprise one or more nodes (e.g., NodeB, eNodeB, ng-eNodeB, gNodeB, en-gNodeB, and the like) that are configured to communicate with user devices in one or more discrete geographic areas using one or more antennas of an antenna array.

The network environment 100 includes user devices 112, 114, 116, 118, and 120 that are in wireless communication with their respective cell cites 106, 108, and 110 via the RAN controllers 102 and 104. In network environment 100, the user devices 112, 114, 116, 118, and 120 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 600) that communicates via wireless communications with the respective cell site in order to interact with one or more component of the network 220. Each of the user devices 112, 114, 116, 118, and 1120 are configured to wirelessly communicate using any one or more wireless communication protocols (e.g., 5G, 4G, and the like).

Figure 2:
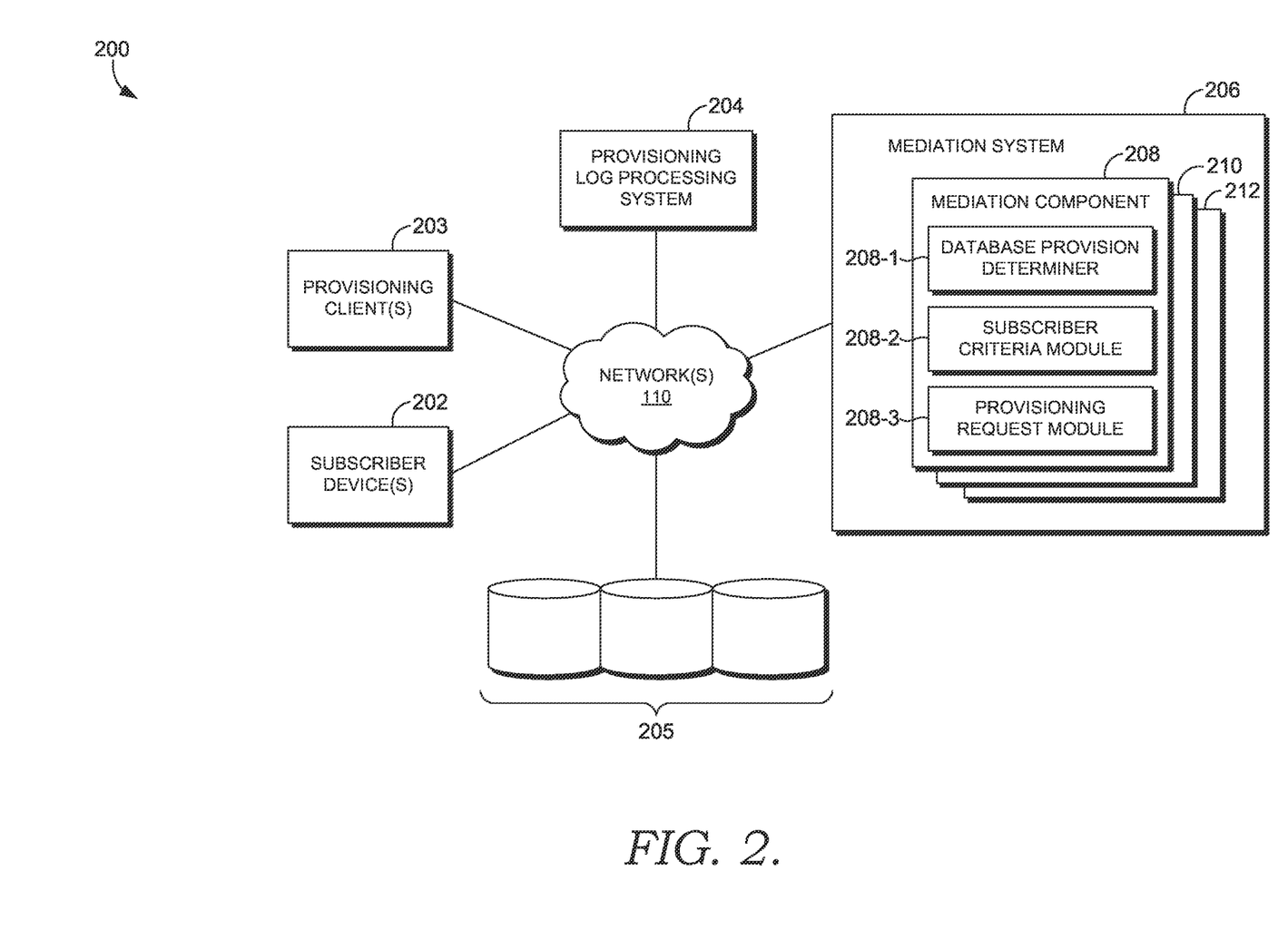
FIG. 2 is a block diagram of an example computing system architecture suitable for implementing embodiments of this disclosure.

In some cases, the user devices in network environment 100 can optionally utilize network(s) 110 to communicate with each other and/or computing devices (e.g., a mobile device(s), a server(s), a personal computer(s), etc.) through the one or more component associated with the cell sites. The network(s) 110 may be or include a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations.

Network(s) 110 can include multiple networks, as well as being a network of networks, but is shown in more simple form so as to not obscure other aspects of the present disclosure. For example, network(s) 110 can include a core network. A core network (e.g., an Evolved Packet Core (EPC)) is responsible for data routing, subscriber authentication, accounting, policy management, and connects the radio access networks (RANs) 120 and 130 (e.g., the RAN controller 102, the data store 105A, the cell sites 106, 108, and the user devices 112, 114, 116) to another network, such as the internet. In some embodiments, the core network includes a control plane and a data plane. A control plane is where signaling occurs—messaging to authenticate subscribers, manage subscriber IP session, apply policies, and charge usage. The data plane is the data pipe for the IP packets of the subscriber device to and from the internet or to one or more servers (e.g., enterprise servers or content network servers). In some embodiments, the core network includes components, such as a gateway (e.g., a packet gateway PGW), which is the public gateway that connects user devices to the public internet, Policy and Charging Rules Function (PCRF) that is responsible for maintaining and evaluating rules for the packet gateway, a Serving Gateway (SGW), and Mobility Management Entity (MME). In another example, the network(s) 110 can include a Public Switched Telephone Network (PSTN) and/or any other suitable network, such as, without limitation, a local area network (LAN) and/or a wide area networks (WAN). In some implementations, network(s) 110 comprises the Internet and/or a cellular network, amongst any of a variety of possible public and/or private networks.

Network(s) 110 can be part of a telecommunications network that connects subscribers to their immediate service provider. In some instances, network(s) 110 can be associated with a telecommunications provider that provides services (e.g., voice, data, SMS) to user devices, such as user devices 210, 212, or 214. For example, network 208 may provide voice, SMS, and/or data services to user devices or corresponding users that are registered or subscribed to utilize the services provided by a telecommunications provider. Network(s) 110 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

Each RAN 120 and 130 includes a respective RAN controller, cell site, data store, and user device components. For example, the RAN 120 includes the RAN controller 102, the data store 105A, the cell cites 106, 108, and the user devices 112, 114, and 116. Each RAN 120 and 130 (and the components thereof—RAN controller, data store, cell sites, and user devices) may be specifically configured to transmit, store, route, or receive data according to any suitable RAT or wireless communication protocol, such as 5G, 4G, LTE, etc. For example, the cell sites 106 and 108 may be specifically built and configured to connect user devices that are 5G capable, whereas cell site 110 may not be built with 5G capability (but only handles 4G service sessions). In another example, the RAN controller 102 may only be responsible for managing data and communication between the cell sites 106, 108, and the data store 105A (and not managing data and communications between cell site 110 and the data store 105B, since the RAN controller 104 is responsible for this). In yet another example, the RAN controller 102 may be or include a Radio Network Controller (RNC), which is responsible for controlling the Node Bs of the UMTS Terrestrial Radio Access Network (UTRAN). Alternatively, in some aspects, the RAN 104 may be or include different controllers, such as an EPC of a LTE wireless communication protocol, and/or a Mobile Switching Center (MSC) of a GSM wireless communication protocol.

The RAN controllers 102 and 104 are generally responsible for communicatively coupling the respective user devices to the network(s) 110 and otherwise manages the RAN (120 or 130) it belongs to using a particular RAT or wireless communication protocol. For example, the RAN controller 102 links the user devices 112 and 114 to the cell cite 106 via a radio link (radio waves) where data can be passed between these components. The RAN controller 102 may then, for example, convert the radio link into IP packets and then pass this data over a fiber or wireless backhaul connection to the network(s) 110.

The data stores 105A and 105B store authentication, authorization, and/or subscriber data that is specific to the RAT or wireless communication protocol that the corresponding RAN uses. For example, the data store 105A may be Home Subscriber Server (HSS) database of a 4G wireless communication protocol, whereas the data store 105B may be a Home Location Register (HLR) database of 2G and 3G wireless communication protocol. These databases are described in more detail below. In some embodiments, components of the network(s) 110 (e.g., a core network) manages this data within the data stores 105. Alternatively or additionally, in some embodiments, the respective RAN controllers 102 or 104 manages this data.

In some instances, particular services (or applications that the services use) are built and deployed for specific RATs or wireless communication protocols and will not immediately run using other wireless communication protocols. For example, with respect to FIG. 1, a service may only run using the RAN 120 but not the RAN 130. This is typically problematic when, for example, the user device 116 moves out of the range (e.g., a RSSI threshold) of the cell cites 106 and 108 and into a range of the cell cite 110 (the RAN of which is not configured to run the service). In typical instances, handover cannot occur between the cell sites of the different RANs of this service because the updating of the data store 105B typically occurs at some batched time interval (e.g., a 24 hour period), meaning that there is an uneven user experience for the user device 116 and the subscriber will not be able to immediately access the service using the RAN 130. Accordingly, some aspects of the present disclosure are directed to a mediation system that causes a provisioning of the data store 105B in near real-time such that the service can run on both the RANs 120 and 130 so as to not affect the user experience when the user device 116 moves out of the RAN 120 range and into the RAN 130 range, as described in more detail below. Some examples of this are described with respect to FIG. 3, FIG. 4, and FIG. 5. In other words, various aspects provide seamless service experiences for a subscriber across multiple wireless communication protocols. It is important for operators to be able to deploy new network services quickly across multiple wireless communication protocols.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

Referring now to FIG. 2, a block diagram is provided showing aspects of an example computing system architecture suitable for implementing an embodiment of the disclosure and designated generally as the system 200. The system 200 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For example, some or each of the components of the system may be located within a single computing device (e.g., the computing device 600 of FIG. 6. For example, the provisioning client(s) 203, the provisioning log processing system 204, and the mediation system may be included in the network(s) 110 (e.g., a core network) or the RAN controller 102 of FIG. 2. Alternatively, some or each of the components may be distributed among various computing devices, such as in a distributed cloud computing environment. For example, the subscriber device(s) 202 may represent the subscriber devices 112, 114, 116, 118, and 120, the provisioning client(s) 203 and the provisioning log processing system 204 may reside in or be controlled by the RAN controller 102, and the mediation system 206 may reside in a core network of the network(s) 110.

In some embodiments, the system 200 and each of the components are provided via a software as a service (SAAS) model, for example, a cloud and/or web-based service. In other embodiments, the functionalities of system 200 may be implemented via a client/server architecture and/or a telecommunications architecture. The system 200 includes network 110, which is described in connection to FIG. 1, and which communicatively couples components of system 200, including the subscriber device(s) 202, the one or more provisioning clients 203, the provisioning log processing system, the mediation system 206, and the wireless communication protocol databases 205. The components of the system 200 may be embodied as a set of compiled computer instructions or functions, program modules, computer software services, logic gates, or an arrangement of processes carried out on one or more computer systems.

The system 200 generally operates to deploy or access a service over multiple wireless communication protocols for one or more subscribers. The subscriber device(s) 202 (also referred to herein to "user device(s)") refer to any suitable one or more computing devices that one or more subscribers use to request access to or run a service. A "subscriber" as described herein refers to a user of a telecommunications network that subscribes to one or more services of the telecommunications network via a subscription. A subscription may define the quantity or type of services a user may consume. A subscription may include a subscriber ID, account type of a user, whether the account is prepaid or postpaid, the value of the subscription, the size of the data a subscriber has received, a quantity of calls a subscriber is allowed to make, and the like.

In some cases, subscribers pay for services received on a monthly basis. Subscription management modules may engage in billing the subscriber for using these services. A "service" as described herein refers to a specific data package allotment type and/or quantity provided by a telecommunications entity to a user or subscriber so that the user can consume the data package as defined by the allotment. For instance, a service can include a particular phone service (a landline wired or wireless phone service) to make and receive calls, a specific television service to watch television or otherwise consume certain media content, and an internet service package to consume or use the internet. Though these are basic descriptions of a service, the service itself can be very particular, such as, for example, a television package with a specific quantity of available bandwidth or a voice package that includes three-way calling, call waiting, and caller ID, or other allotments. In some aspects, a service can include specific applications, routines, or software packages that a subscriber can use.

In some embodiments, a subscriber or other user inputs information at the subscriber device(s) 202 so as to trigger a request to access a service. For example, a user could open a browser client application and input search engine terms or a URL to request access watch the Super Bowl, which automatically triggers a background request to access a telecommunications service that includes removing a barring limitation during the day of the Super Bowl (or other days and/or times), thereby allowing updated bandwidth to users with a specific device. In other words, for example, a particular subscriber may be barred from watching a particular television channel because they did not pay for the channel. However, the service may include the functionality of removing such bar given that the request to access happened on a particular day.

The provisioning client(s) 203 is generally responsible for receiving and handling access requests from the subscriber device(s) 202, provisioning specific databases (among the databases 205) depending on the wireless communication protocols associated with the subscriber device(s) 202, and, sending provisioning request information to the log provisioning processing system 204. To "provision" a database in various embodiments refers to configuring, deploying, managing, providing, authenticating/authorizing a user, and/or otherwise making a particular service accessible so a specific subscriber via a specific wireless communication protocol by writing/reading information to/from a corresponding database. For example, a provisioning client may provision a 4G HSS database by storing or reading user profile information (e.g., subscriber device ID, services allowed, authentication/authorization of the user) such that the subscriber may access a particular service by checking the services allowed and subscriber ID against the service requested by the subscriber device(s) 202.

In some embodiments, the determination of whether a database can be provisioned or whether a service can be accessed via a particular wireless communication protocol includes a provisioning client checking request data against a source database (e.g., within the databases 205). A "source" database is a particular database assigned to a particular provisioning client (and/or mediation component) such that the provisioning client is responsible for provisioning the corresponding source database. In an illustrative example, a first provisioning client may first receive an access request from one of the subscriber device(s) 202, where the request includes a packet of data, and where header information of the data packet includes a subscriber device ID, the ID of the service requested for access, as well as the ID of the wireless communication protocol used. The first provisioning client may be assigned to the source database of the corresponding wireless communication protocol. Consequently, the first provisioning client may then read a data structure (e.g., within one of the databases 205), such as a lookup table or hash map where the subscriber ID is a key, and then service IDs allowed are the values indicative of all of the services the particular subscriber is allowed to access. In other words, the provisioning client(s) 203 determines whether there is a match between the header information in the packet with the information contained in the corresponding source database in order to provision the source database or allow a subscriber access a service. In some embodiments, a source database is a database that the assigned provisioned client reads from (but not writes to).

The log provisioning system 204 is generally responsible for logging or otherwise writing database provisioning request data to a data structure, such as a log file, so as to keep a history of all provisioning requests and related data (e.g., whether a particular provisioning client has already provisioned a database). Such data structure may include different attributes that are to be populated for every record or entry, such as a timestamp of the provisioning request or timestamp of the actual provisioning of the database, the ID of the provisioned database, subscriber device ID responsible for the provisioning request, provisioning client ID that issued the provisioning request, wireless communication protocol ID, and the like. For example, at a first time a first subscriber device of the subscriber device(s) 202 may issue a first access request to access a first service using a first wireless communication protocol. A first provisioning client of the provisioning client(s) 203 may then pass this information to the log provisioning log processing system 204. The log provisioning log processing system 204 responsively generates or populates a single log entry indicating that the first subscriber device issued the access request using the first communication protocol, the first provisioning client handled the request and issued the provisioning request, all at 4 p.m.

The mediation system 206 is generally responsible for accessing the log data structure populated by the provisioning log processing system 204 (or otherwise calling the provisioning log processing system 204 to access the structure or receiving this information from 302 itself), accessing the corresponding databases 205, and comparing the log data to data in one or more of the corresponding databases 205 in order to ultimately determine whether the subscriber has access to the corresponding service. In alternative embodiments, however, the mediation system 206 need not directly access or call (or receive calls from) the provisioning log processing system 204, but rather directly receives this information from the subscriber device(s) 202 and/or the provisioning client(s) 203.

The mediation system 206 includes multiple mediation components 208, 210, and 212, and each mediation component includes a database provision determiner, a subscriber criteria module, and a provisioning request module, as illustrated by 208-1, 208-2, and 208-3 for the mediation component 208. A "mediation component" refers to any specific process, module, or sub-component of the mediation system 206 (or the mediation system 206 in its entirety), that is configured to determine, for a specific wireless communication protocol or database, whether a particular subscriber has access to a service that it has requested access for. In some embodiments, each of the mediation components 208, 210, 212 is assigned or configured to handle requests associated with a specific (or subset) "source" database of the databases 205. For example, the mediation component 208 may only be configured to receive provisioning log data from a first provisioning client whereas the mediation component 210 may only be configured to receive provisioning log data from a second provisioning client. The database provision determiner 208-1 is generally responsible for receiving (e.g., from the provisioning log processing system 204) one or more indications (e.g., flags, Boolean value, etc.) that one or more provisioning clients associated with one or more subscribers have already provisioned (or not provisioned) the source database the mediation component 208 is assigned to.

The subscriber criteria module 208-2 is generally responsible for determining whether one or more subscribers meet criteria (also referred to as "modification criteria") to access corresponding services for each destination database in 205 of corresponding wireless communication protocols. In some embodiments, a "destination" database is a database that is not assigned to a particular provisioning client or mediation component and does not include a "source" database. In some embodiments, a destination database is a database that data is written to (but not read from), such as data indicating that a particular subscriber may now access a service on additional wireless communication protocols. The data write may alternatively or additionally include other information, such as a request for a particular provisioning client to provision a specific database.

In some embodiments, such modification criteria is indicative one or more rules or policies that a subscriber must meet to access the service using additional wireless communication protocols relative to a communication protocol associated with the source database for which the subscriber has already been granted access to. In an illustrative example, modification criteria may include a subscription that requires a specific brand or device type or related thresholds (e.g., CPU, GPU, or memory capacity). For example, at a first time a provisioning client 203 may have provisioned a first database so that a subscriber can access a first service using 4G. In near-real time, the subscriber criteria module 208-2 may then compare the subscriber information against a 5G database, which requires a higher speed device to run the first service on so it is determined whether the subscriber has a device that meets the higher speed demands to run a 5G service.

In some embodiments, the subscriber criteria module 208-2 functions similar to or in unison with the provisioning client(s) 203. For example, the subscriber criteria module 208-2 may first receive a log file or otherwise receive log information (from the provisioning log processing system 204) that includes a subscriber device ID, the ID of the service requested for access, as well as whether the source database it is assigned to has already been provisioned. The mediation component 208 (or more specifically the subscriber criteria module 208-2) may then read a data structure of each of the databases 205 (i.e., databases of multiple wireless communication protocols), such as a lookup table or hash map where the subscriber ID is a key, and then service IDs allowed are the values indicative of all of the services the particular subscriber is allowed to access. In other words, the subscriber criteria module 208-2 determines whether there is a match between the log information and the information contained in the corresponding destination databases in order to determine whether a subscriber meets the criteria.

The provisioning request module 208-3 is generally responsible for transmitting destination database provisioning requests or otherwise calling particular provisioning clients 203 so that the corresponding provisioning clients can provision (or refrain from provisioning) a respective destination database based on whether the subscriber meets the modification criteria determined by the subscriber criteria module 208-2. For example, using the illustration above, if the subscriber device meets GPU requirements to run a service on 5G, the mediation component 208 can cause a control signal to be propagated to the assigned provisioning client so that the provisioning client can provision a UDR database. Such provisioning thereby causes the subscriber to now access the same service using 5G, as well as 4G, for example.

Each of the databases 205 store subscriber-specific and wireless communication protocol-specific information to authenticate and authorize a particular subscriber to access a specific service using a specific wireless communication protocol. In some embodiments, the databases 205 include the data stores 105A and 105B of FIG. 1. The databases 205 allow the network(s) 110 (e.g., a core network) to grant access for a specific subscriber device to run or deploy a specific service using a specific wireless communication protocol. For example, one of the databases 205 can include a Home Subscriber Server (HSS) database of a 4G wireless communication protocol. HSS is a key element of LTE and IMS core networks. It is a master user database that is stored in one single node. It allows Communications Service Providers (CSPs) to manage customers (subscribers) in real-time. HSS is the master user database that supports the IMS network entities that handle calls/sessions. It contains user profiles, performs authentication and authorization of the user, and provides information (e.g., triangulation coordinates) about the physical location of a subscriber device. HSS is a concatenation of the HLR and Authentication Center (AuC), which are two functions present in 2G/GSM and 3G/UMTS networks. The HLR part of the HSS is in charge of storing an updating user subscription information.

In another example, one of the databases 205 can be a Home Location Register (HLR) database of 2G and 3G wireless communication protocols. HLR is the main database of permanent subscriber information for a mobile network. The HLR is an integral component of CDMA (code division multiple access), TDMA (time division multiple access), and GSM (Global System for Mobile Communications) networks. Maintained by the subscriber's home carrier (or network operator where the user initiated the call), HLR includes pertinent user information (e.g., address, account status, and preferences). HLR interacts with the Mobile Switching Center (MSC), which is a switch used for call control and processing. MSC also serves as a point-of-access to the Public Switched Telephone Network (PSTN).

Another element of the HLR database is the Visiting Location Register (VLR), which maintains temporary user information (e.g., current geolocation coordinates) to manage requests from subscribers who are out of the area (or outside of a communication range) by their home system. When a user initiates a call, for example, the switching equipment determines whether or not the call is coming from the device's home area. If the user is out of the home area, the area VLR sends out a request for information required to process the call. An MSC queries the HLR identified by the call for information, which it relays to the appropriate MSC, which in turn relays it to the VLR. The VLR sends routing information back to the MSC, which allows it to find the station where the call originated so allow the communication between user devices.

In yet another example, one of the databases 205 can be a User Data Repository (UDR) database of a 5G wireless communication protocol. UDR is a functional entity that acts as a single logical repository storing subscriber data. Accordingly, UDR includes all subscriber/subscription related information needed by the PCRF. UDR provides a unique reference point (Ud) to fetch subscriber/subscription data.

Figure 3:
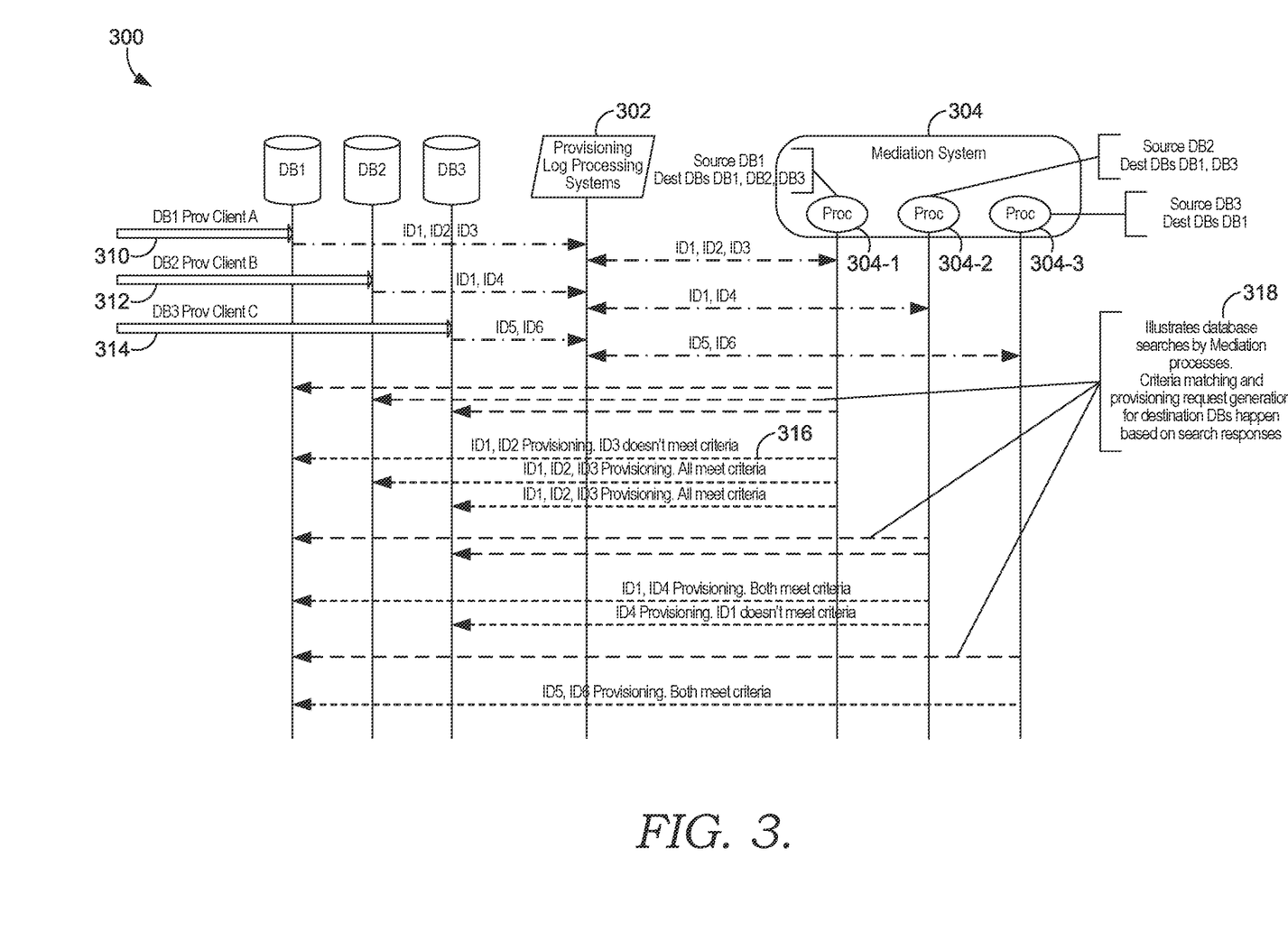
FIG. 3 is a sequence diagram illustrating different provisioning clients sending respective provisioning requests to a respective source database of a wireless communication protocol to deploy a service and a mediation system updating corresponding destination databases of other wireless communication protocols to deploy the same service, according to some embodiments.

FIG. 3 is a sequence diagram illustrating different provisioning clients sending respective provisioning requests to a respective source database of a wireless communication protocol to deploy a service and a mediation system updating corresponding destination databases of other wireless communication protocols to deploy the same service, according to some embodiments. In some embodiments, the databases—database 1 (DB1), database 2 (DB2), and database 3 (DB3)—are included among the databases 205 of FIG. 2. In some embodiments, the provisioning log processing system 302 represents the provisioning log processing system 204 of FIG. In some embodiments, the mediation system 304 represents the mediation system 206 of FIG. 2. In some embodiments, each of the processes 304-1, 304-2, and 304-3 respectively represent the mediation components 208, 210, and 212 of FIG. 2. In some embodiments, the provisioning requests 310, 312, and 314 are issued by the provisioning client(s) 202 of FIG. 2.

FIG. 3 illustrates that the same service can be deployed across three different wireless communication protocols by updating, in near-real time, each of the corresponding databases based on predefined criteria being met. In today's landscape, wireless telecommunications networks cannot provision databases of multiple wireless communication protocols simultaneously or in near real-time. If a provisioning client requests to deploy a new service using a new wireless communication protocol, the provisioning client typically has to be changed at the software and/or hardware level. For example, communication interfaces, configurations (e.g., routing or switching) and/or authentication mechanisms have to be re-arranged so that the new service can seamlessly run using the new wireless communication protocol. Each deployment has its own lifecycle, such as 1 month, 6 months, or a year, which is a lengthy process just to deploy a service for a given wireless communication protocol. In other words in some instances, where a service has only been built to run on a single wireless communication protocol, there is currently no way to seamlessly deploy the service across multiple wireless communication protocols to make a service quickly and readily available to consumers.

In order to overcome these deployment issues, various embodiments are directed to a mediation system that makes updates such that whenever there is a change to a database (e.g., DB1), all of the other databases (e.g., DB2 and DB3) are updated so as to remain in synch with respect to a particular service. With respect to FIG. 3, at a first time a first provisioning client issues the provisioning request 310 to provision DB1 to deploy a first service for three subscribers (ID1, ID2, and ID3). As described herein, many services require authentication and/or authorization across one or more network platforms for different wireless communication protocols. In some embodiments, such provisioning may include authentication and authorizing a specific subscriber to access a particular service using a particular wireless communication protocol. DB1 may be the "source" database for the first service, which may be indicative that the source database is the database that initially receives the provisioning request.

In some embodiments, a database is a "source" database for a particular provisioning client based on the provisioning client having been built or configured to use the particular source database or corresponding wireless communication protocol. Alternatively or additionally, in some embodiments, the database (e.g., DB1) is a source database for a particular provisioning client based on being available to handle the request, such as 310 (e.g., because the other databases or wireless communication protocols are currently handling other provisioning requests 312 and 314).

In response to the DB1 being provisioned and/or in response to the provisioning request 310, the provisioning log processing system 302 generates one or more log entries, in a log file or data structure, which indicates associated provisioning metadata, such as the time of the provisioning of DB1, the time that the provisioning request 310 was received, the ID of the provisioning client that issued the request 310, and/or the subscriber IDS (e.g., ID1, ID2, and ID3) that the provisioning client is issuing the provisioning request for.

In response to the provisioning log system 302 logging the entries, it transmits (and/or the process 304-1 does a computer read of) the subscriber IDS 1, 2, and 2 to the process 304-1 of the mediation system 304. In some embodiments, the process 304-1 receives an indication (e.g., a flag or binary value) that the DB1 provisioning client associated with subscribers 1, 2, and 3 has provisioned DB1 to access a first service. That is, for the current client provisioning request 310, the source database is DB1. In some embodiments, the process 304-1 is only configured to handle requests where the DB1 is a source database. This same policy may be true with respect to the process 304-2 and the process 304-3—process 304-2 may be configured to only handle requests from DB2 provisioning client (request 312 and no other requests 310 and 314) and process 304-3 may be configured to only handle request from DB3 provisioning client (request 314 and no other requests).

In some embodiments, in response to the process 304-1 reading the subscription IDs or the service IDs from DB1 and/or the log file, it determines whether the service corresponding to the service ID has already been applied for the subscribers corresponding to the subscription IDs. In some embodiments, when a service has already been applied, this means that the other databases—DB2 and DB3 have already stored the necessary information for particular subscriber authorization and/or authentication such that the corresponding service can be deployed or accessed by a particular subscriber using the respective particular wireless communication protocols. In some embodiments, if the service has already been applied for the particular destination database and for the particular subscriber, then no further action is needed. In some embodiments, if the service has not already been applied, then the process 304-1 determines whether the subscriber meets particular criteria to access the service, such as whether the Mobile Directory Number (MDN) (e.g., a phone number) matches the MDN in a registration database for a subscriber, whether the subscription matches the correct brand, device type, and/or price plan of a user device or account, as denoted by 318. If the subscriber meets the criteria, then the other databases DB2 and DB3 are updated accordingly such that the subscriber is authorized and authenticated to access the service using the other wireless communication protocols associated with DB2 and DB3. In other words, both databases DB2 and DB3 are subsequently provisioned for the specific subscriber. As illustrated by 316 of FIG. 3, for the provisioning request 310, subscribers 1 and 2 (ID 1 and ID 2) meet the criteria, while subscriber 3 does not meet the criteria.

In some embodiments, the above process described for the provisioning request 310 is repeated for provisioning requests 312 and/or 314. For example, at a point in time parallel to or substantially the same time as the first time (i.e., the receiving of the provisioning request 310), the provisioning requests 312 and 314 for various subscribers may be received to provision a corresponding source database. Those provisions may then be logged via the provisioning log processing system 302. Particular embodiments may then determine, via the processes 304-2 and 304-3, whether the particular subscribers meet criteria. For example, 318 represents the corresponding processes searching or reading the corresponding databases do determine if the information contained in the destination databases—DB2 and DB3—match or meet the criteria, as described herein.

FIG. 3 illustrates that services can quickly be deployed for multiple subscribers and multiple wireless communication protocols. This helps the operator get early bird advantages for new services, without negatively impacting customer experience. In some embodiments, FIG. 3 illustrates that multiple services can be deployed simultaneously for multiple wireless communication protocols and multiple subscribers. Different selection criteria for each database update can be determined and quickly implemented using queries/scripting methods.

Figure 4:
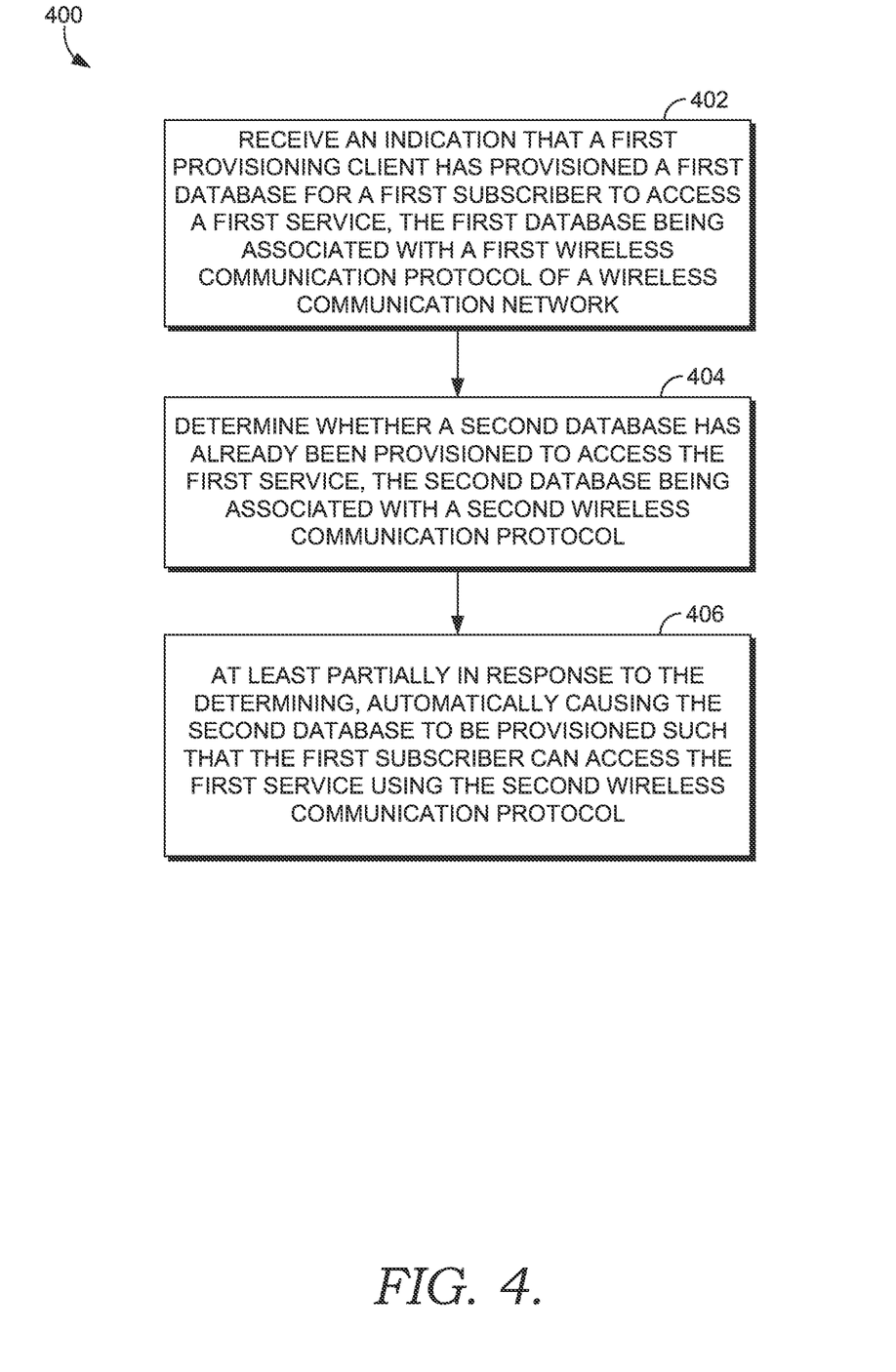
FIG. 4 is a flow diagram of an example process for provisioning multiple databases so that a first subscriber can access a first service using multiple wireless communication protocols, according to some embodiments.

FIG. 4 is a flow diagram of an example process 400 for provisioning multiple databases so that a first subscriber can access a first service using multiple wireless communication protocols, according to some embodiments. The process 400 (and/or any of the functionality described herein, such as 500) may be performed by processing logic that comprises hardware (for example, circuitry, dedicated logic, programmable logic, microcode, etc.), software (for example, instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (for example, as described with respect to FIG. 1 through FIG. 6). The computer-implemented method, the system (that includes at least one computing device having at least one processor and at least one computer readable storage medium), and/or the computer readable medium as described herein may perform or be caused to perform the process 400 or any other functionality described herein.

Per block 402, some embodiments receive an indication (e.g., a flag value) that a first provisioning client associated with a first subscriber has provisioned a first database to access a first service. The first database is associated with (e.g., is a part of or included in) a first wireless communication protocol of a wireless communication network. Some examples of block 402 are described with respect to the provisioning client(s) 203 provisioning a database and/or provisioning client A sending a provisioning request 310 to provision DB1 (e.g., the source database). Such wireless communication network can represent or include any suitable network, such as a cellular or mobile network, a Global Area Network (GAN), wireless LAN, wireless MAN, and/or any network described with respect to the network(s) 110. In some embodiments, block 402 is performed by an individual mediation component, such as the mediation component 208 or the process 304-1, as described herein.

In some embodiments, block 402 can include (and/or be preceded by) receiving a request for a first subscriber to access a first service. Examples of this are described with respect to the subscriber device(s) 202 and the provisioning client(s) 203, where, for instance, a subscriber can input a URL at a browser client application to access an application using a first service and such service access request is responsively transmitted to the provisioning client(s) 203. In some embodiments, the first wireless communication protocol and the second wireless communication protocol are different wireless communication protocols, such as a second generation cellular network (2G), a third generation cellular network (3G), a fourth generation cellular network (4G), a fifth generation cellular network (5G), a Wi-Fi (IEEE 802.11) network, Bluetooth, Global System for Communications (GSM), Universal Mobile Telecommunications System (UMTS), or Long-Term Evolution (LTE). In some embodiments, a "wireless communication protocol" includes a Radio Access Technology (RAT), which is the underlying physical connection method for a radio-based communication network. Subscriber devices or UE typically support one or more RATs. In some embodiments, the first database and the second database are different databases, such as a Unified Data Repository (UDR), a Home Subscriber Server (HSS) database, and a Home Location Register (HLR) database, as described herein.

In some embodiments, the receiving of the indication at block 402 includes receiving, from a provisioning log processing system, a batch of entries indicated in a provisioning log, where a first entry indicates that the first provisioning client associated with the first subscriber has provisioned the first database to access the first service. Some examples of this are described with respect to the process 304-1 of FIG. 3, which receives subscriber IDs 1, 2, and 3. Other examples are described with respect to the mediation component 208, which reads or otherwise accesses a log file produced by the provisioning log processing system 204 of FIG. 2. Alternatively, in some embodiments, the receiving of the indication includes receiving, from the first database and in near real-time, the indication that the first provisioning client associated with the first subscriber has provisioned the first database to access the first service. Examples of this are described with respect to the database provision determiner 208-1, which can determine that a provisioning client has provisioned a database based on directly communicating with the provisioning client(s) 203 and/or the databases 205, as opposed to receiving log data from the provisioning log processing system 204 of FIG. 2.

In some embodiments, the first mediation component is included among at least a second mediation component, where the first mediation component is configured to process requests that have provisioned the first database but not the second database, and where the second mediation component is configured to process requests that have provisioned the second database but not the first database. Some examples of this are described with respect to some embodiments of the processes 304-1, 304-2, and 304-3, where each process is configured to handle specific requests (e.g., 310, 312, and 314) from specific provisioning clients, specific databases, specific entries in a log file, and/or specific wireless communication protocols. For example, process 304-1 may only be configured to read log data of provisions/ provision requests in a log file of Client A (and not client B or client C) and the corresponding client A source database, even though the process 304-1 can send requests to additional destination databases, as described with respect to FIG. 3.

Per block 404, it is determined whether a second database has already been provisioned to access the first service, where the second database is associated with (e.g., is a part of or included in) a second wireless communication protocol. Some examples of block 404 are described with respect to 318 of FIG. 3. In some embodiments, block 404 includes automatically reading (or causing a read of), by a first mediation component and in response to the receiving of the indication at block 402, at least the second database to determine whether the second database has already been provisioned for access of the first service. For example, the process 304-1 may read an HSS database to determine whether a subscriber device ID and corresponding device data (e.g., CPU/GPU, memory, etc.) meets device requirements, as specified in the HSS database, in order to deploy a specific service using a specific wireless communication protocol. In some embodiments, block 404 includes determining whether a plurality of databases have been provisioned for the first subscriber to access the first service, where each database, of the plurality of databases, are associated with a unique wireless communication protocol. Some examples of this are described with respect to the process 304-1, which receives an indication regarding whether a source database has been provisioned and determines whether the first subscriber meets criteria, as described with respect to 318.

In some embodiments block 404 includes or is supplemented with determining whether the first subscriber meets criteria to have access to the first service using the second wireless communication protocol, where the automatic transmission of the request to provision to the second database further occurs in response to the determining that the first subscriber meets the criteria. Examples of this are described with respect to 318 of FIG. 3.

Some embodiments perform block 404 for additional databases associated with additional wireless communication protocols. For example, in response to the receiving at block 402, some embodiments determine whether a third database has already been provisioned to access the first service, where the third database is associated with a third wireless communication protocol (e.g., HSS) but not the first wireless communication protocol (e.g., UDR) or the second wireless communication protocol (e.g., HLR). And in response to determining that the third database has not already been provisioned to access the first service (e.g., and determining that the first subscriber meets the criteria), some embodiments cause a provisioning of the third database (e.g., by transmitting a request to a provisioning client to provision the third database) such that the first subscriber can access the first service using the third communication protocol. Conversely, at least partially in response to determining that the third database has already been provisioned to access the first service, some embodiments refrain from provisioning the third database (e.g., by refraining from transmitting a request to a provisioning client to provision the third database).

Per block 406, at least partially in response to the determining at block 404, some embodiments automatically cause the second database to be provisioned such that the first subscriber can access the first service using the first wireless communication protocol and the second wireless communication protocol. Some examples of this are described with respect to 316 of FIG. 3 and the provisioning request module 208-3, which transmits a request to the provisioning client(s) 203 to provision a destination database. In some embodiments, block 406 includes automatically transmitting (e.g., by a first mediation component) a request to provision the second database. Some examples of this are described with respect to the functionality of the provisioning request module 208-3.

In some embodiments, block 406 includes or is supplemented with automatically causing a provisioning of the plurality of databases based at least in part on the first subscriber meeting criteria to access the first service using the first communication protocol and the second wireless communication protocol such that the first subscriber can access the first service using the second wireless communication protocol and the first wireless communication protocol. Some examples of this are described with respect to the subscriber criteria module 208-2 and 318 of FIG. 3.

In some embodiments, the process 400 occurs in near real-time relative to the time at which a subscriber device requests access for a service and/or otherwise accesses the service using a first wireless communication protocol. For example, a first subscriber may request access to stream first content using a first wireless communication protocol (e.g., 5G), where the first content is not deployed, built, or configured to run using any other wireless communication protocol. The first subscriber accessing the first content using the first wireless communication protocol means that a corresponding provisioning client has provisioned a database so that the first service can run using the first wireless communication protocol for the first subscriber. In some embodiments, the process 400 occurs in near real-time relative to the time at which a service is deployed using a specific wireless communication protocol (e.g., without a subscriber technically requesting access to a service). In other embodiments, the process 400 or any of the functionality described herein does not occur in near real-time either with respect to a subscriber request for a service or a service being deployed for the first time.

In response to such provisioning or the first subscriber's access request to stream the first content using the first wireless communication protocol, blocks 404 and 406 may automatically occur regardless of subscriber device activity. For example, the subscriber device can maintain a connection range of a base station of a first wireless communication protocol (e.g., the user continues to watch the first content) but still be given access to the service using other wireless communication protocols, in case the subscriber device moves out of range of the first wireless communication protocol. For example, the first subscriber may start driving away from a coverage area of the first wireless communication protocol such that the subscriber device falls out of range for using the first wireless communication protocol for providing the first content. However, because the additional databases of the other wireless communication protocols have already been provisioned in near real-time (e.g., the process 400), the subscriber device can seamlessly render the first content using a second wireless communication protocol (e.g., 4G) even though the first content was not originally built to provide the first content. This is different than existing technologies that fail to update or provision databases until some predefined maintenance scheduling time to process multiple batched entries. For example, using the illustration above, if the subscriber device moved outside of a communication range (e.g., RSSI) of a base station (e.g., cell site 108) associated with the first wireless communication protocol and into range of a base station (e.g., cell site 110) associated with the second wireless communication protocol, the subscriber would not be able to access the first content using the second wireless communication protocol because the corresponding database has not yet been updated, thereby negatively affecting the user experience.

Figure 5:
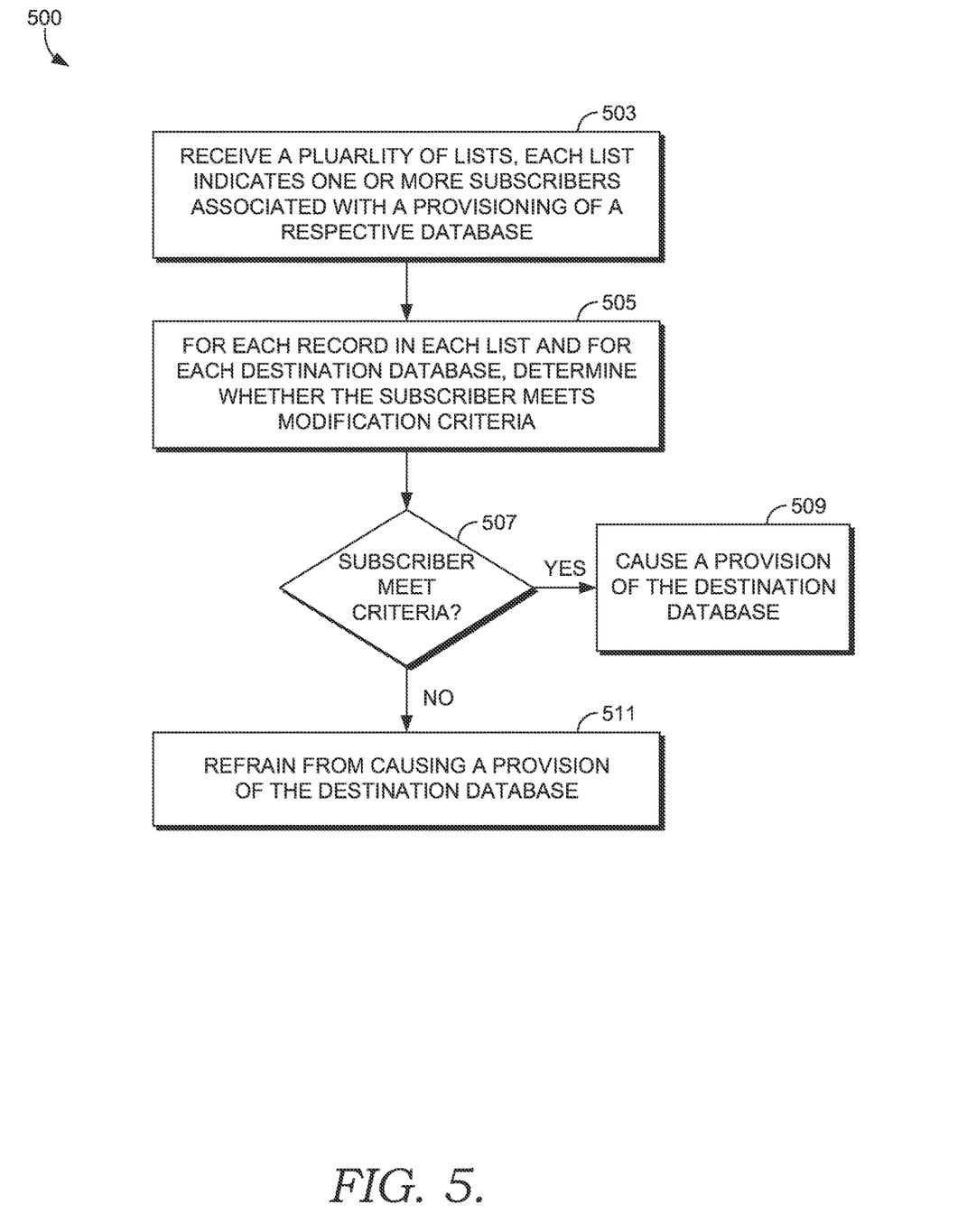
FIG. 5 is a flow diagram of an example process for provisioning a database, according to some embodiments.

FIG. 5 is a flow diagram of an example process 500 for provisioning a database, according to some embodiments. In some embodiments, the process 500 represents the functionality as described with respect to the sequence diagram 300 of FIG. 3. In some embodiments, the mediation system 304 of FIG. 3 performs the process 500. Per block 503, some embodiments receive a plurality of lists, where each list indicates one or more subscribers associated with a provisioning of a respective database (e.g., a source database). Some examples of this are described with respect to the process 304-1 receiving the subscriber IDs from the provisioning log processing system 302 (i.e., receiving ID1, ID2, and ID3). A first list can include ID1, ID2, and ID3. A second list can include the process 304-2 receiving ID1, and ID4, as illustrated in FIG. 3. A third list can include the process 304-3 receiving the ID5, and ID6, as illustrated in FIG. 3. In other words, the mediation system can receive periodic updates (e.g., every few seconds) from each database, a list of all unique subscriptions touched by provisioning in that database for the last period or cycle.

In some embodiments, such list is sent out directly to a mediation component by a database (or database manager). Alternatively, such list is sent out direction to a mediation component by a provisioning log processing system, such as 302. As described herein, in some embodiments, a different listener or mediation component processes records of subscriptions touched in different databases. For example, one list for HSS, one for UDR, on for HLR (or even its own HSS database). Such examples are described with respect to FIG. 3, where each of the processes 304-1, 304-2, and 304-3 are configured to process requests associated with corresponding databases—DB1, DB2, and DB3. In some embodiments, each list includes a set of destination databases. For example, for source database UDR list, the destination databases can be HSS and HLR.

Per block 505, for each record (or subscriber) in each list and for each destination database, particular aspects determine whether the subscriber meets modification criteria (e.g., the modification criteria described with respect to the subscriber criteria module 208-2 of FIG. 2 or 318 of FIG. 3. For example, it can be determined whether a subscription or subscriber meets the correct brand, device type, price plan, in order to access a particular service using a particular wireless communication protocol. In some embodiments, each destination database is queried via a query interface using a relevant key. In some embodiments, blocks 505 and 507 are included in block 404 of FIG. 4.

Per block 507, it is determined whether the subscriber meets the modification criteria. For example, a first mediation component can compare log data identifying a subscriber and requested service with authentication and/or authorization information within one of the databases 205 to determine whether the subscriber can access the service using the corresponding wireless communication protocol. Per block 509, if the subscriber meets the criteria, then particular embodiments cause a provision of the destination database such that the subscriber can access the service using the corresponding wireless communication protocol. Per block 511, if the subscriber does not meet the criteria, the particular embodiments refrain from causing a provisioning of the destination database. This can be because the database has already been provisioned and the subscriber can consequently access the service using the corresponding wireless communication protocol. Or this can be because the subscriber is not authenticated or authorized to access the service using the corresponding wireless communication protocol. In some embodiments, blocks 509 and 511 are included in block 406 of FIG. 4.

In some embodiments, block 509 is done in such a fashion that the provisioning request is not reported back as a provisioning update (e.g., to the provisioning log processing system 204/302) to avoid a provisioning loop. In this way, all databases can be updated with the relevant new service within the span of a few seconds. In some embodiments, already existing subscriptions can be updated on one database using a backfill scripting process and the mediation system (e.g., 206) ensures that all other databases get update automatically. The process 500 (and/or 600) also solves the problem of future updates or provisions on any database, which potentially reverts to the provisioning for new services that may get negated by the provisioning from the mediation system in near real time.

Figure 6:
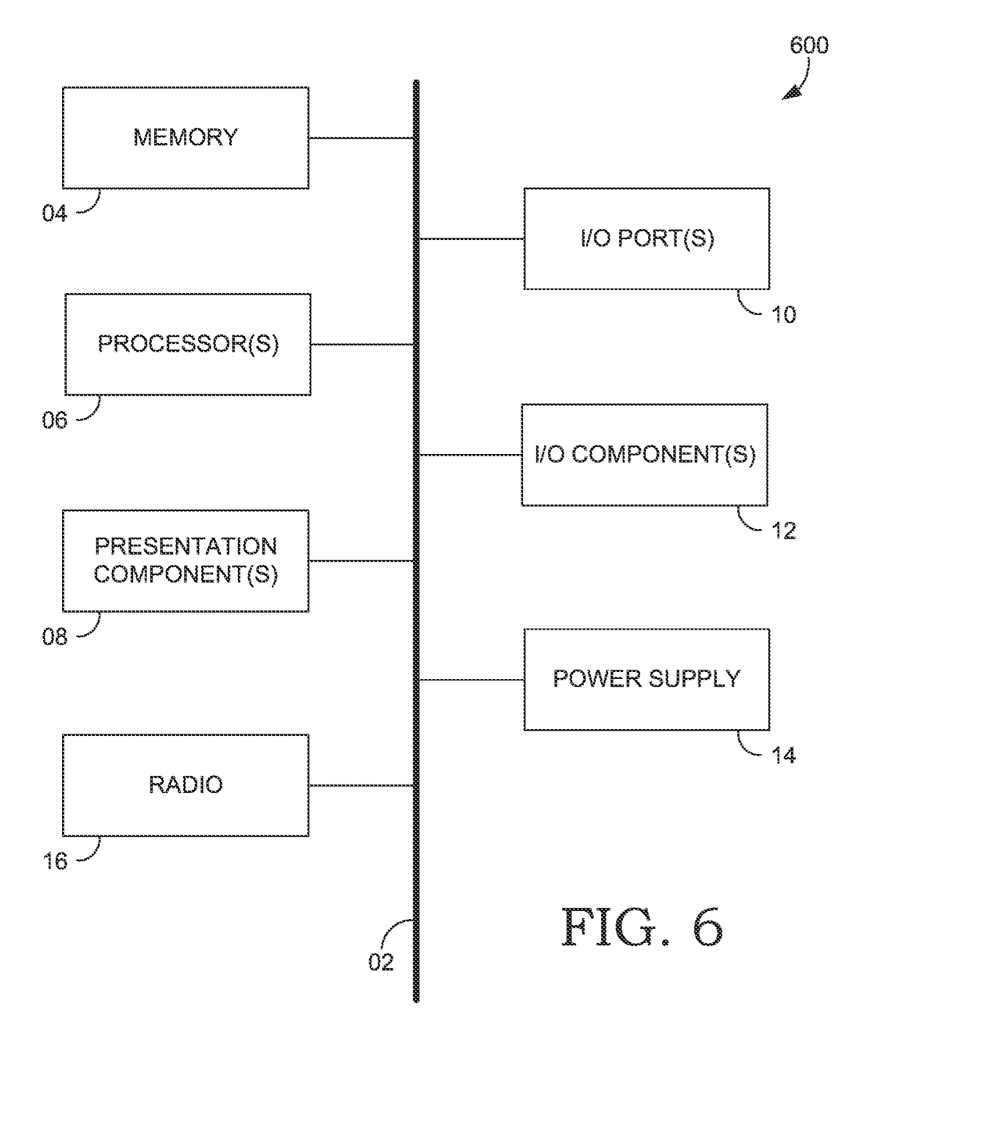
FIG. 6 is a block diagram of an example computing environment suitable for use with implementations of the present disclosure.

Referring to FIG. 6, a block diagram is depicted of an exemplary computing environment suitable for use with implementations of the present disclosure. In particular, the exemplary computer environment is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated. In aspects, the computing device 600 may be a UE, WCD, or other user device, capable of two-way wireless communications with an access point. Some non-limiting examples of the computing device 600 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 02 that directly or indirectly couples the following devices: memory 04, one or more processors 06, one or more presentation components 08, input/output (I/O) ports 10, I/O components 12, and power supply 14. Bus 02 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 12. Also, processors, such as one or more processors 06, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 04 includes computer-storage media in the form of volatile and/or nonvolatile memory. Memory 04 may be removable, nonremovable, or a combination thereof. Exemplary memory includes solid-state memory, hard drives, optical-disc drives, etc. Computing device 600 includes one or more processors 06 that read data from various entities such as bus 02, memory 04 or I/O components 12. One or more presentation components 08 presents data indications to a person or other device. Exemplary one or more presentation components 08 include a display device, speaker, printing component, vibrating component, etc. I/O ports 10 allow computing device 600 to be logically coupled to other devices including I/O components 12, some of which may be built in computing device 600. Illustrative I/O components 12 include a microphone, joystick, game pad, satellite dish, scanner, printer, wireless device, etc.

Radio 16 represents a radio that facilitates communication with a wireless telecommunications network. In aspects, the radio 16 utilizes one or more transmitters, receivers, and antennas to communicate with the wireless telecommunications network on a first downlink/uplink channel. Though only one radio is depicted in FIG. 6, it is expressly conceived that the computing device 600 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 16 might additionally or alternatively facilitate other types of wireless communications including Wi-Fi, WiMAX, LTE, or other VoIP communications. As can be appreciated, in various embodiments, radio 16 can be configured to support multiple radio access technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

What is claimed is:

1. A computer-implemented method comprising:
   receiving, by a first mediation component, an indication that a first provisioning client associated with a first subscriber has provisioned a first database to access a first service, the first database being associated with a first wireless communication protocol of a wireless communication network;
   in response to the receiving, automatically reading, by the first mediation component, at least a second database to determine whether the second database has already been provisioned for access of the first service, the second database being associated with a second wireless communication protocol but not the first wireless communication protocol; and
   at least partially in response to determining that the second database has not already been provisioned to access the first service, automatically transmitting, by the first mediation component, a request to provision the second database, wherein the second database is provisioned such that at least the first subscriber can access the first service using second wireless communication protocol.

2. The method of claim 1, wherein the first wireless communication protocol and the second wireless communication protocol are different wireless communication protocols that are from group consisting of: 2G, 3G, 4G, 5G, and Wi-Fi.

3. The method of claim 1, wherein the first database and the second database are different databases that are from a group of databases consisting of: a Unified Data Repository (UDR), a Home Subscriber Server (HSS) database, and a Home Location Register (HLR).

4. The method of claim 1, wherein the receiving of the indication includes receiving, from a provisioning log processing system, a batch of entries indicated in a provisioning log, a first entry indicates that the first provisioning client associated with the first subscriber has provisioned the first database to access the first service.

5. The method of claim 1, wherein the receiving of the indication includes receiving, from the first database and in near real-time, the indication that the first provisioning client associated with the first subscriber has provisioned the first database to access the first service.

6. The method of claim 1, further comprising: determining whether the first subscriber meets criteria to have access to the first service using the second wireless communication protocol, and wherein the automatic transmission of the request to provision the second database further occurs in response to the determining that the first subscriber meets the criteria.

7. The method of claim 1, further comprising:
   in response to the receiving, automatically reading, by the first mediation component, at least a third database to determine whether the third database has already been provisioned to access the first service, the third database being included in a third wireless communication protocol but not the first wireless communication protocol or the second wireless communication protocol; and
   at least partially in response to determining that the third database has not already been provisioned to access the first service, automatically transmitting, by the first mediation component, a request to provision the third database, wherein the third database is provisioned such that at least the first subscriber can access the first service using the third wireless communication protocol.

8. The method of claim 1, further comprising:
   in response to the receiving, automatically reading, by the first mediation component, at least a third database to determine whether the third database has already been provisioned to access the first service, the third database being included in a third wireless communication protocol but not the second wireless communication protocol or the first wireless communication protocol; and
   at least partially in response to determining that the third database has already been provisioned to access the first service, refrain from transmitting a request to provision the third database.

9. The method of claim 1, wherein the first mediation component is included among at least a second mediation component, and wherein the first mediation component is configured to process requests that have provisioned the first database but not the second database, and wherein the second mediation component is configured to process requests that have provisioned the second database but not the first database, and wherein the first mediation component and the second mediation component are included in the wireless communication network.

10. A system comprising:
    at least one computer processor; and
    one or more computer storage media storing computer-useable instructions that, when used by the at least one computer processor, cause the at least one computer processor to perform operations comprising:
    receiving an indication that a first provisioning client associated with a first subscriber has provisioned a first database to access a first service, the first database being associated with a first wireless communication protocol of a wireless communication network;

in response to the receiving, automatically determining whether the second database has already been provisioned to access the first service, the second database being associated with a second wireless communication protocol but not the first wireless communication protocol; and at least partially in response to determining that the second database has not already been provisioned to access the first service, automatically causing a provisioning of the second database such that at least the first subscriber can access the first service using second wireless communication protocol and the first wireless communication protocol.

11. The system of claim 10, wherein the first wireless communication protocol and the second wireless communication protocol are different wireless communication protocols that are from group consisting of: 2G, 3G, 4G, 5G, and Wi-Fi.

12. The system of claim 10, wherein the first database and the second database are different databases that are from a group of databases consisting of: a Unified Data Repository (UDR), a Home Subscriber Server (HSS) database, and a Home Location Register (HLR).

13. The system of claim 10, wherein the receiving of the indication includes receiving, from a provisioning log processing system, a batch of entries indicated in a provisioning log, a first entry indicates that the first provisioning client associated with the first subscriber has provisioned the first database to access the first service.

14. The system of claim 10, wherein the receiving of the indication includes receiving, from the first database and in near real-time, the indication that the first provisioning client associated with the first subscriber has provisioned the first database to access the first service.

15. The system of claim 10, wherein the operations further comprise determining whether the first subscriber meets criteria to have access to the first service using the second wireless communication protocol, and wherein the automatic causing of the provisioning of the second database further occurs in response to the determining that the first subscriber meets the criteria.

16. The system of claim 10, wherein the operations further comprise:

in response to the receiving, automatically reading, by the first mediation component, at least a third database to determine whether the third database has already been provisioned to access the first service, the third database being included in a third wireless communication protocol but not the first wireless communication protocol or the second wireless communication protocol; and at least partially in response to determining that the third database has not already been provisioned to access the first service, automatically transmitting, by the first mediation component, a request to provision the third database, wherein the third database is provisioned such that at least the first subscriber can access the first service using the third wireless communication protocol.

17. The system of claim 10, wherein the operations further comprise:

in response to the receiving, automatically reading, by the first mediation component, at least a third database to determine whether the third database has already been provisioned to access the first service, the third database being included in a third wireless communication protocol but not the second wireless communication protocol or the first wireless communication protocol; and at least partially in response to determining that the third database has already been provisioned to access the first service, refrain from transmitting a request to provision the third database.

18. The system of claim 10, wherein the first mediation component is included among at least a second mediation component, and wherein the first mediation component is configured to process requests that have provisioned the first database but not the second database, and wherein the second mediation component is configured to process requests that have provisioned the second database but not the first database, and wherein the first mediation component and the second mediation component are included in the wireless communication network.

19. One or more non transitory computer-readable media having computer-executable instructions embodied thereon that, when executed, cause the one or more processors to: receive a request for a first subscriber to access a first service; at least partially responsive to the receiving, determining whether a plurality of databases have been provisioned for the first subscriber to access the first service, each database, of the plurality of databases, being associated with a unique wireless communication protocol; based at least in part on the first subscriber meeting criteria to access the first service using at least a first wireless communication protocol and a second wireless communication protocol, automatically causing the provisioning of the plurality of databases such that the first subscriber can access the first service using at least the second wireless communication protocol and the first wireless communication protocol.

20. The one or more non transitory computer-readable media of claim 19, wherein the determining and the automatically causing occur in near real-time relative to the receiving of the first request.

* * * * *